United States Patent
Saunders et al.

(10) Patent No.: US 9,020,069 B2
(45) Date of Patent: Apr. 28, 2015

(54) ACTIVE GENERAL PURPOSE HYBRID

(71) Applicant: Viasat, Inc., Carlsbad, CA (US)

(72) Inventors: David R Saunders, Scottsdale, AZ (US);
David W Corman, Gilbert, AZ (US);
Kenneth V Buer, Gilbert, AZ (US);
Dean L Cook, Mesa, AZ (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 14/176,092

(22) Filed: Feb. 8, 2014

(65) Prior Publication Data

US 2014/0192926 A1    Jul. 10, 2014

Related U.S. Application Data

(63) Continuation of application No. 13/306,937, filed on Nov. 29, 2011, now Pat. No. 8,699,626.

(51) Int. Cl.
*H04L 27/36* (2006.01)
*H04B 7/06* (2006.01)

(52) U.S. Cl.
CPC .......... *H04L 27/365* (2013.01); *H04B 7/0686* (2013.01); *H04L 27/362* (2013.01)

(58) Field of Classification Search
CPC ....................................... H04B 7/0686
USPC ........................................... 375/316
See application file for complete search history.

(56) References Cited

U.S. PATENT DOCUMENTS

| | | | |
|---|---|---|---|
| 3,119,965 | A | 1/1964 | Phillips |
| 3,842,362 | A | 10/1974 | Dimon |
| 4,318,104 | A | 3/1982 | Enein |
| 4,697,281 | A | 9/1987 | O'Sullivan |
| 4,857,777 | A | 8/1989 | Altes |
| 4,857,778 | A | 8/1989 | Hague |
| 4,896,374 | A | 1/1990 | Waugh et al. |

(Continued)

FOREIGN PATENT DOCUMENTS

| | | |
|---|---|---|
| EP | 0762660 A2 | 3/1997 |
| EP | 1193861 A2 | 4/2002 |

(Continued)

OTHER PUBLICATIONS

Non-Final Office Action for U.S. Appl. No. 14/177,612, mailed May 21, 2014, 10 pgs.

(Continued)

*Primary Examiner* — Santiago Garcia (57) ABSTRACT

A general purpose hybrid includes a first input port in communication with a first dual vector generator, a second input port in communication with a second dual vector generator, a first active combiner receives a first signal from the first dual vector generator and a third signal from the second dual vector generator, where the first and second dual vector generators independently apply phase shifting and amplitude control to the first and third signals; a second active combiner receives a second signal from the first dual vector generator and a fourth signal from the second dual vector generator, where the first and second dual vector generators independently apply phase shifting and amplitude control to the second and fourth signals; a first output port provides a first composite signal from the first active combiner; and a second output port provides a second composite signal from the second active combiner.

7 Claims, 6 Drawing Sheets

(56) References Cited

U.S. PATENT DOCUMENTS

| | | | |
|---|---|---|---|
| 4,907,003 A | 3/1990 | Marshall et al. | |
| 4,955,080 A | 9/1990 | Wagai et al. | |
| 4,965,602 A | 10/1990 | Kahrilas et al. | |
| 4,994,773 A | 2/1991 | Chen et al. | |
| 5,038,147 A | 8/1991 | Cerro et al. | |
| 5,045,822 A | 9/1991 | Mohwinkel | |
| 5,086,302 A | 2/1992 | Miller | |
| 5,128,687 A | 7/1992 | Fay | |
| 5,270,719 A | 12/1993 | Roth | |
| 5,351,053 A | 9/1994 | Wicks et al. | |
| 5,418,815 A | 5/1995 | Ishikawa et al. | |
| 5,539,413 A | 7/1996 | Farrell et al. | |
| 5,848,060 A | 12/1998 | Dent | |
| 5,907,815 A | 5/1999 | Grimm et al. | |
| 5,942,929 A | 8/1999 | Aparin | |
| 5,966,049 A | 10/1999 | Yuen et al. | |
| 5,966,371 A | 10/1999 | Sherman | |
| 6,005,515 A | 12/1999 | Allen et al. | |
| 6,061,553 A | 5/2000 | Matsuoka et al. | |
| 6,232,837 B1 | 5/2001 | Yoo et al. | |
| 6,326,845 B1 | 12/2001 | Miyaji et al. | |
| 6,411,824 B1 | 6/2002 | Eidson | |
| 6,424,281 B1 * | 7/2002 | Liaw et al. | 341/144 |
| 6,597,899 B2 | 7/2003 | Souetinov et al. | |
| 6,611,230 B2 | 8/2003 | Phelan | |
| 6,784,817 B2 | 8/2004 | Matsuura et al. | |
| 6,853,248 B2 | 2/2005 | Weldon | |
| 6,946,990 B2 | 9/2005 | Monk | |
| 7,081,788 B2 | 7/2006 | Hagari | |
| 7,098,859 B2 | 8/2006 | Shimawaki et al. | |
| 7,164,738 B2 | 1/2007 | Miyamoto et al. | |
| 7,177,615 B2 | 2/2007 | Ono | |
| 7,180,447 B1 | 2/2007 | Jacomb-Hood et al. | |
| 7,319,345 B2 | 1/2008 | Farjad-rad et al. | |
| 7,355,470 B2 | 4/2008 | Sorrells et al. | |
| 7,378,902 B2 | 5/2008 | Sorrells et al. | |
| 7,400,193 B2 | 7/2008 | Wyatt | |
| 7,408,507 B1 | 8/2008 | Peak et al. | |
| 7,420,423 B2 | 9/2008 | Lee et al. | |
| 7,421,036 B2 | 9/2008 | Sorrells et al. | |
| 7,436,370 B2 | 10/2008 | Blanton | |
| 7,460,623 B1 | 12/2008 | Radionov et al. | |
| 7,620,129 B2 | 11/2009 | Sorrells et al. | |
| 7,672,653 B2 | 3/2010 | Cowley et al. | |
| 7,715,815 B2 | 5/2010 | Gomez | |
| 7,728,784 B2 | 6/2010 | Mohamadi | |
| 7,746,764 B2 | 6/2010 | Rawlins et al. | |
| 7,750,733 B2 | 7/2010 | Sorrells et al. | |
| 7,755,430 B2 | 7/2010 | Imagawa | |
| 7,817,757 B2 | 10/2010 | Hidaka | |
| 7,826,550 B2 * | 11/2010 | Rofougaran | 375/271 |
| 7,885,682 B2 | 2/2011 | Sorrells et al. | |
| 8,013,784 B2 | 9/2011 | Margomenos et al. | |
| 8,030,998 B2 | 10/2011 | Corman | |
| 8,085,877 B2 * | 12/2011 | Rofougaran | 375/324 |
| 8,160,530 B2 * | 4/2012 | Corman et al. | 455/276.1 |
| 8,228,232 B2 | 7/2012 | Corman et al. | |
| 8,289,209 B2 | 10/2012 | Corman et al. | |
| 8,400,235 B2 | 3/2013 | Corman | |
| 8,410,980 B2 | 4/2013 | Corman et al. | |
| 8,416,882 B2 | 4/2013 | Corman et al. | |
| 8,452,251 B2 | 5/2013 | Saunders | |
| 8,587,492 B2 | 11/2013 | Runyon | |
| 8,639,204 B2 * | 1/2014 | Corman et al. | 455/276.1 |
| 8,693,970 B2 | 4/2014 | Corman et al. | |
| 8,699,626 B2 | 4/2014 | Saunders et al. | |
| 8,773,219 B2 | 7/2014 | Corman | |
| 8,817,672 B2 | 8/2014 | Corman et al. | |
| 8,837,632 B2 | 9/2014 | Saunders | |
| 2002/0080084 A1 | 6/2002 | Strickland | |
| 2002/0113648 A1 * | 8/2002 | Miyaji et al. | 330/151 |
| 2002/0151274 A1 | 10/2002 | Rosen et al. | |
| 2003/0016085 A1 | 1/2003 | Yamazaki | |
| 2003/0030895 A1 | 2/2003 | So et al. | |
| 2003/0080898 A1 | 5/2003 | Wang et al. | |
| 2003/0102911 A1 | 6/2003 | Raghavan et al. | |
| 2003/0133517 A1 * | 7/2003 | Takinami et al. | 375/322 |
| 2003/0151550 A1 | 8/2003 | Chen et al. | |
| 2003/0162566 A1 | 8/2003 | Shapira et al. | |
| 2003/0190922 A1 | 10/2003 | Dalvi et al. | |
| 2004/0095190 A1 | 5/2004 | Klaren et al. | |
| 2004/0119636 A1 | 6/2004 | Edvardsson et al. | |
| 2004/0121750 A1 | 6/2004 | Nation | |
| 2004/0229584 A1 | 11/2004 | Fischer et al. | |
| 2005/0113052 A1 | 5/2005 | Rabinovich et al. | |
| 2005/0151698 A1 | 7/2005 | Mohamadi | |
| 2006/0045038 A1 | 3/2006 | Kay et al. | |
| 2006/0170499 A1 | 8/2006 | Rahman et al. | |
| 2007/0248186 A1 | 10/2007 | Sorrells et al. | |
| 2007/0275674 A1 | 11/2007 | Chien | |
| 2007/0279061 A1 * | 12/2007 | Erickson et al. | 324/322 |
| 2007/0280384 A1 | 12/2007 | Hidaka | |
| 2008/0051053 A1 | 2/2008 | Fedan | |
| 2008/0055151 A1 | 3/2008 | Hudson et al. | |
| 2008/0129408 A1 | 6/2008 | Nagaishi et al. | |
| 2008/0129634 A1 | 6/2008 | Pera et al. | |
| 2008/0218424 A1 | 9/2008 | Blanton | |
| 2008/0233865 A1 | 9/2008 | Malarky et al. | |
| 2009/0015474 A1 | 1/2009 | Wicks et al. | |
| 2009/0086851 A1 * | 4/2009 | Rofougaran | 375/324 |
| 2009/0091384 A1 | 4/2009 | Sorrells et al. | |
| 2010/0039174 A1 | 2/2010 | Teetzel | |
| 2010/0073085 A1 | 3/2010 | Sorrells et al. | |
| 2010/0097138 A1 * | 4/2010 | Sorrells et al. | 330/149 |
| 2010/0225389 A1 * | 9/2010 | Teetzel | 330/149 |
| 2010/0259312 A1 | 10/2010 | Menon et al. | |
| 2010/0260076 A1 | 10/2010 | Corman et al. | |
| 2010/0260285 A1 * | 10/2010 | Corman et al. | 375/295 |
| 2010/0261440 A1 * | 10/2010 | Corman et al. | 455/91 |
| 2010/0321107 A1 * | 12/2010 | Honcharenko | 330/124 R |
| 2011/0006948 A1 | 1/2011 | Larregle et al. | |
| 2011/0142104 A1 | 6/2011 | Coldrey et al. | |
| 2013/0058382 A1 * | 3/2013 | Matsuura | 375/219 |
| 2013/0058438 A1 | 3/2013 | Self | |
| 2013/0135022 A1 | 5/2013 | Saunders | |
| 2013/0136209 A1 | 5/2013 | Saunders | |
| 2013/0162319 A1 | 6/2013 | Corman | |
| 2014/0191789 A1 | 7/2014 | Saunders | |
| 2014/0197987 A1 | 7/2014 | Corman et al. | |

FOREIGN PATENT DOCUMENTS

| | | |
|---|---|---|
| EP | 1501156 A1 | 1/2005 |
| EP | 2419964 A1 | 2/2012 |
| EP | 2419963 B1 | 11/2013 |
| JP | 5617536 | 2/1981 |
| JP | 09326629 | 12/1997 |
| JP | 2002057515 | 2/2002 |
| JP | 2002141849 | 5/2002 |
| JP | 2003168938 | 6/2003 |
| JP | 2003229738 | 8/2003 |
| JP | 2004241972 | 8/2004 |
| JP | 2005045790 | 2/2005 |
| JP | 5677697 | 1/2015 |
| JP | 20155994 | 1/2015 |
| TW | 200715705 | 4/2007 |
| WO | WO-98/56123 A1 | 12/1998 |
| WO | WO-99/45609 A1 | 9/1999 |
| WO | WO-00/03456 | 1/2000 |
| WO | WO-00/33419 A1 | 6/2000 |
| WO | WO-02/41442 A1 | 5/2002 |
| WO | WO-03/036756 A2 | 5/2003 |
| WO | WO-2006/071153 A1 | 7/2006 |
| WO | WO-2008/126985 A1 | 10/2008 |
| WO | WO-2009/043917 A1 | 4/2009 |
| WO | WO-2010/120756 A1 | 10/2010 |
| WO | WO-2010/120760 A2 | 10/2010 |
| WO | WO-2010/120762 A2 | 10/2010 |
| WO | WO-2010/120767 A2 | 10/2010 |
| WO | WO-2010/120768 A2 | 10/2010 |
| WO | WO-2010/120770 A1 | 10/2010 |

(56) References Cited

FOREIGN PATENT DOCUMENTS

| WO | WO-2010/120779 A2 | 10/2010 |
|----|-------------------|---------|
| WO | WO-2010/120790 A2 | 10/2010 |

OTHER PUBLICATIONS

Extended European Search Report mailed in European Patent Application No. 13193382.2 on Apr. 2, 2014, 6 pgs.
Supplemental Notice of Allowability mailed in U.S. Appl. No. 12/759,112 on Jul. 9, 2014, 2 pgs.
Corrected Notice of Allowability mailed in U.S. Appl. No. 13/771,884 on Jun. 6, 2014, 2 pgs.
Notice of Allowance mailed in U.S. Appl. No. 14/177,612 on Aug. 4, 2014, 8 pgs.
Non-Final Office Action mailed in U.S. Appl. No. 14/216,760 on Sep. 26, 2014, 5 pgs.
U.S. Appl. No. 14/334,280, filed Jul. 17, 2014, 68 pgs.
Notice of Allowance mailed in Japanese Patent Application No. 2012-506132 on Jul. 9, 2014, 3 pgs.
Notice of Allowance mailed in Japanese Patent Application No. 2012-506127 on Jul. 23, 2014, 3 pgs.
Ayari et al., "Automatic Test Vector Generation for Mixed-Signal Circuits", EDTC '95 Proceedings of the 1995 European Conference on Design and Test, Mar. 1995, 6 pgs.
Hsiao, "Analysis of Interleaved Arrays of Waveguide Elements", IEEE Transactions on Antennas and Propagation, vol. 19, No. 6, Nov. 1971, pp. 729-735.
Koh et al., "0.13-$\mu$m CMOS Phase Shifters for X-, K$u$-, and K-Band Phased Arrays", IEEE Journal of Solid-State Circuits, vol. 42, No. 11, Nov. 2007, pp. 2535-2546.
Koh et al., "A Q-Band (40-45 GHz) 16-Element Phased-Array Transmitter in 0.18—$\mu$m SiGe BiCMOS Technology", IEEE, 2008, pp. 225-228.
Koh et al., "An X- and K$\mu$-Band 8-Element Phased-Array Receiver in 0.18—$\mu$m SiGe BiCMOS Technology", IEEE, vol. 43, No. 6, Jun. 2008, pp. 1360-1371.
Lee et al., "Broadband Quadrature Hybrid Design Using Metamaterial Transmission Line and Its Application in the Broadband Continuous Phase Shifter", IEEE/MTT-S International, Microwave Symposium, Jun. 2007, pp. 1745-1748.
Safarian et al., "Distributed Active Power Combiners and Splitters for Multi-Antenna UWB Transceivers", IEEE, Sep. 2006, pp. 138-141.
Strassberg, "RF-Vector-Signal Generator Combines High Throughput, Low Phase Noise", EDN, Oct. 6, 2009, 2 pgs.
Tokumitsu et al., "Active Isolator, Combiner, Divider, and Magic-T as Miniaturized Function Blocks", Gallium Arsenide Integrated Circuit (GaAs IC) Symposium, Nov. 1988, pp. 273-276.
Viallon et al., "An Original SiGe Active Differential Output Power Splitter for Millimetre-wave Applications", Microwave Conference, Oct. 2003, 4 pgs.
Zheng et al., "Full 360° Vector-Sum Phase-Shifter for Microwave System Applications", IEEE Transactions on Circuits and Systems I: Regular Papers, vol. 57, No. 4, Apr. 2010, pp. 752-758.
International Search Report and Written Opinion mailed in International Application No. PCT/US2010/030881 on Jul. 19, 2010, 8 pgs.
International Search Report and Written Opinion mailed in International Application No. PCT/US2010/030864 on Aug. 23, 2010, 8 pgs.
International Search Report and Written Opinion mailed in International Application No. PCT/US2010/030876 on Oct. 27, 2010, 7 pgs.
International Search Report and Written Opinion mailed in International Application No. PCT/US2010/030871 on Nov. 18, 2010, 8 pgs.
International Search Report and Written Opinion mailed in International Application No. PCT/US2010/030868 on Nov. 26, 2010, 8 pgs.
International Search Report and Written Opinion mailed in International Application No. PCT/US2010/030877 on Nov. 26, 2010, 8 pgs.
International Search Report and Written Opinion mailed in International Application No. PCT/US2010/030892 on Nov. 26, 2010, 7 pgs.
International Search Report and Written Opinion mailed in International Application No. PCT/US2010/030906 on Nov. 30, 2010, 9 pgs.
International Preliminary Report on Patentability mailed in International Application No. PCT/US2010/030877 on Jul. 18, 2011, 7 pgs.
International Preliminary Report on Patentability mailed in International Application No. PCT/US2010/030892 on Jul. 18, 2011, 6 pgs.
International Preliminary Report on Patentability mailed in International Application No. PCT/US2010/030906 on Jul. 18, 2011, 6 pgs.
International Preliminary Report on Patentability mailed in International Application No. PCT/US2010/030881 on Oct. 18, 2011, 5 pgs.
International Preliminary Report on Patentability mailed in International Application No. PCT/US2010/030864 on Oct. 18, 2011, 5 pgs.
International Preliminary Report on Patentability mailed in International Application No. PCT/US2010/030876 on Oct. 18, 2011, 5 pgs.
International Preliminary Report on Patentability mailed in International Application No. PCT/US2010/030871 on Oct. 18, 2011, 5 pgs.
International Preliminary Report on Patentability mailed in International Application No. PCT/US2010/030868 on Oct. 18, 2011, 6 pgs.
Non-Final Office Action for U.S. Appl. No. 12/759,112, mailed May 21, 2013, 5 pgs.
Non-Final Office Action mailed in U.S. Appl. No. 13/306,503 on Jul. 10, 2013, 12 pgs.
Non-Final Office Action for U.S. Appl. No. 12/759,112, mailed Sep. 6, 2013, 7 pgs.
Non-Final Office Action for U.S. Appl. No. 13/771,884 on Sep. 24, 2013, 6 pgs.
Japanese Official Action, Notice of Reasons for Rejection for Japanese Patent Application No. 2012-506127, mailed Oct. 29, 2013, 8 pgs. including English language translation.
Japanese Official Action, Notice of Reasons for Rejection for Japanese Patent Application No. 2012-506132, mailed Oct. 31, 2013, 4 pgs. including English language translation.
Search Report for European Patent Application No. 10765025.1 mailed Dec. 12, 2013, 6 pgs.
Notice of Allowance mailed in U.S. Appl. No. 13/306,503 on Dec. 23, 2013, 8 pgs.
Non-Final Office Action for U.S. Appl. No. 12/759,112, mailed Jan. 9, 2014, 19 pgs.
Notice of Allowance mailed in U.S. Appl. No. 13/771,884 on Jan. 10, 2014, 7 pgs.
Japanese Official Action, Notice of Reasons for Rejection for Japanese Patent Application No. 2012-506124, mailed Feb. 19, 2014, 5 pgs. including English language translation.
U.S. Appl. No. 14/109,306, filed Dec. 17, 2013, 117 pgs.
U.S. Appl. No. 14/177,612, filed Feb. 11, 2014, 34 pgs.
U.S. Appl. No. 14/216,760, filed Mar. 17, 2014, 171 pgs.
Notice of Allowance mailed in U.S. Appl. No. 12/759,112 on Apr. 28, 2014, 5 pgs.
Examination Report mailed in European Patent Application No. 10716940.1 on Oct. 24, 2014, 5 pgs.
Notice of Allowance mailed in U.S. Appl. No. 14/216,760 on Dec. 15, 2014, 9 pgs.
Notice of Allowance mailed in Japanese Patent Application No. 2012-506124 on Dec. 19, 2014, 3 pgs.
Office Action mailed in Taiwanese Patent Application No. 099111400 on Jan. 21, 2015, 4 pgs. including English language translation.
Extended European Search Report mailed in European Patent Application No. 13195576.7 on Jan. 26, 2015, 8 pgs.
U.S. Appl. No. 14/617,630, filed Feb. 9, 2015, 158 pgs.
Non-Final Office Action mailed in U.S. Appl. No. 14/334,280 on Feb. 26, 2015, 7 pgs.

* cited by examiner

ACTIVE GENERAL PURPOSE HYBRID

CROSS-REFERENCE TO RELATED APPLICATIONS

This application is a continuation of U.S. patent application Ser. No. 13/306,937 filed on 29 Nov. 2011, entitled "Active General Purpose Hybrid", which is incorporated by reference herein.

BACKGROUND

Practically all radio frequency (RF) and antenna systems utilize a range of components such as phase shifters, power splitters, power combiners, and RF hybrids. For phased array applications, these functions are typically implemented at every element in the phased array which greatly increases system size, weight, cost, and complexity.

Quadrature hybrids or other differential phase generating hybrids may be used in a variety of RF and antenna applications. In an example embodiment, quadrature hybrids may be used for generating circular polarization signals, power combining, or power splitting. In particular, branchline hybrids may be used for a variety of functions where generation or summation of quadrature signals is desired. Applications include generation of polarization signals, power combining, power splitting, balanced amplifiers, and the like. Due to its distributed nature, a prior art branchline hybrid may be limited operating over a relatively narrow band of frequencies (typically 10% bandwidth) and require significant physical space to be produced, particularly at lower frequencies where wavelengths are longer, such as C-band or below. In various embodiments, the outputs of a quadrature hybrid have approximately equal amplitude and a 90° phase difference. In other typical embodiments, a quadrature hybrid is implemented as a distributed structure, such as a branchline hybrid coupler. However, often multiple component types are needed to meet design and manufacturing specifications. The various types of implemented components increase manufacturing costs and design time.

BRIEF DESCRIPTION OF THE DRAWING FIGURES

A more complete understanding of the present invention may be derived by referring to the detailed description and claims when considered in connection with the drawing figures, and:

DETAILED DESCRIPTION

While various embodiments are described herein in sufficient detail to enable those skilled in the art to practice the invention, it should be understood that other embodiments may be realized and that logical, material, electrical, and mechanical changes may be made without departing from the spirit and scope of the invention. Thus, the following detailed description is presented for purposes of illustration only.

In accordance with various embodiments, a general purpose hybrid may have various designs and may be comprised of various components. For example, a single general purpose hybrid may be configured to perform the functions of different passive or active hybrids, such as a branchline hybrid, a magic tee hybrid, and/or a quadrature hybrid. For such functions, the general purpose hybrid may include a vector generator, a power splitter, a power combiner, or the like. Furthermore, the embodiments described in this disclosure may include passive components in place of the active components.

In various embodiments, a general purpose hybrid may comprise at least one vector generator, at least one active power splitter, and at least one active power combiner. A vector generator may be used to perform phase shifting and amplitude control. In various embodiments, a vector generator converts an RF input signal into an output signal (sometimes referred to as an output vector) that is shifted in phase and/or amplitude to a desired level. This replaces the function of a typical phase shifter and adds the capability of amplitude control. In other words, a vector generator is a magnitude and phase control circuit.

In various embodiments, the vector generator may accomplish the phase shifting and amplitude control by feeding the RF input signal into a quadrature network resulting in two output signals that differ in phase by about 90°. The two output signals may be fed into parallel quadrant select circuits, and then through parallel variable gain amplifiers (VGAs). In various embodiments, an active vector generator comprises a first quadrant select in parallel with a second quadrant select and a first variable gain amplifier in parallel with a second variable gain amplifier. In various embodiments, the quadrant select circuits may receive commands and may be configured to either pass the output signals with no additional relative phase shift between them or invert either or both of the output signals by an additional 180°. In this fashion, all four possible quadrants of the 360° continuum are available to both orthogonal signals. The resulting composite output signals from the current summer are modulated in at least one of amplitude and phase.

Figure 1:
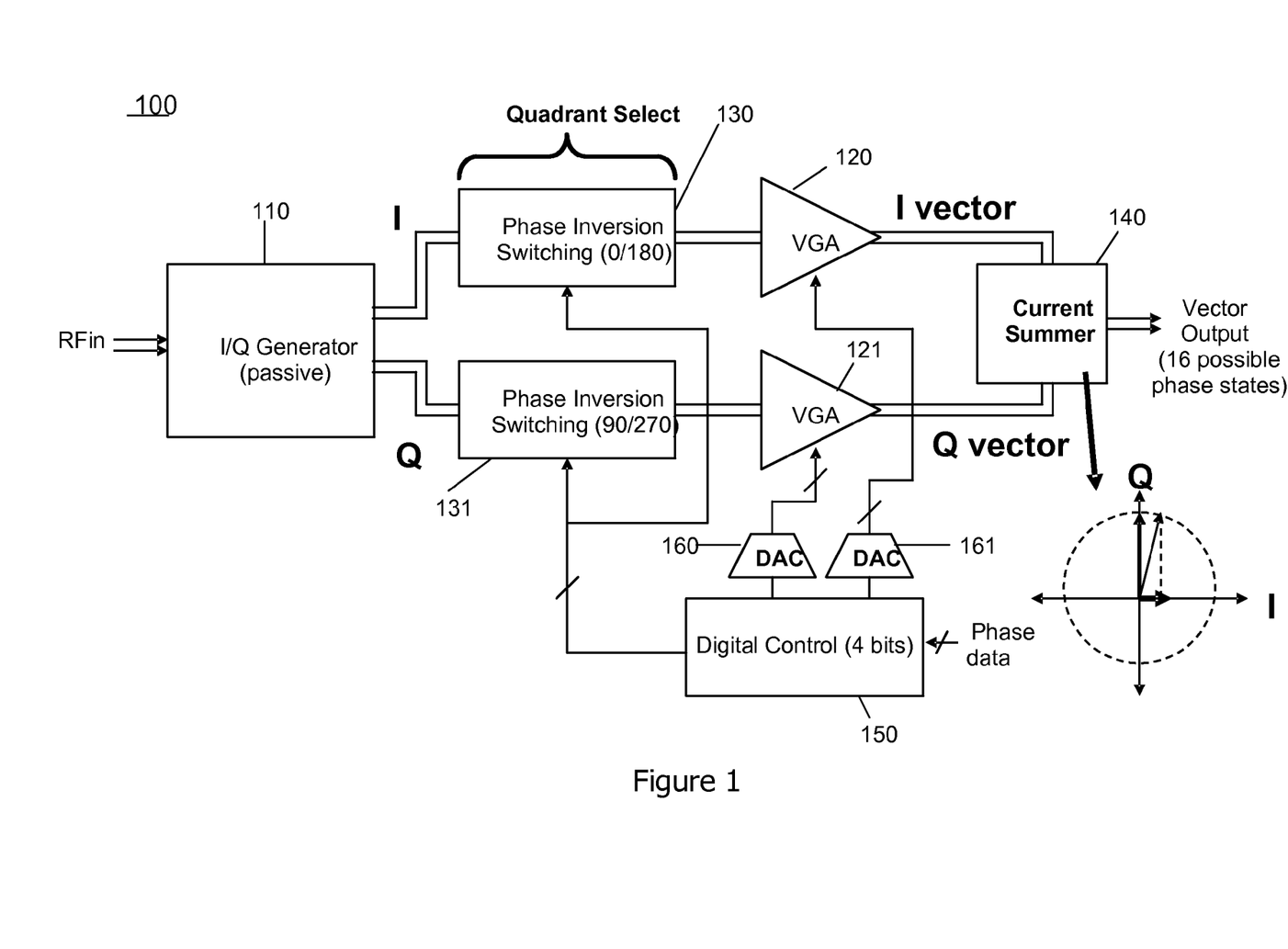
FIG. 1 illustrates an example embodiment of a vector generator.

In accordance with various embodiments and with reference to FIG. 1, a vector generator 100 comprises a passive I/Q generator 110, a first VGA 120 and a second VGA 121, a first quadrant select 130 and a second quadrant select 131 each configured for phase inversion switching, and a current summer 140. The first quadrant select 130 is in communication with I/Q generator 110 and first VGA 120. The second quadrant select 131 is in communication with I/Q generator 110 and second VGA 121. Furthermore, in various embodiments, vector generator 100 may comprise a digital controller 150 that controls a first digital-to-analog converter (DAC) 160 and a second DAC 161. The first and second DACs 160, 161 may control first and second VGAs 121, 120, respectively. Additionally, digital controller 150 may control first and second quadrant selects 130, 131.

In various embodiments, vector generator 100 controls the phase and amplitude of an RF signal by splitting the RF signal into two separate vectors, the in-phase (I) vector and the quadrature-phase (Q) vector. The phase and amplitude adjustment of the RF signal may be provided for polarization tracking and beam steering.

In one embodiment, the RF signal may be communicated differentially. The differential RF signal communication may be throughout vector generator 100 or limited to various portions of vector generator 100. In other various embodiments, the RF signals may be communicated non-differentially. The I vector and Q vector are processed in parallel, each passing through the phase inverting switching performed by first and second quadrant selects 130, 131. The resultant outputs of the phase inverting switches comprise four possible signals: a non-inverted I, an inverted I, a non-inverted Q, and an inverted Q. In this manner, all four quadrants of a phasor diagram are available for further processing by VGAs 120, 121. In various embodiments, two of the four possible signals non-inverted I, inverted I, non-inverted Q, and inverted Q are processed respectively through VGAs 120, 121, until the two selected signals are combined in current summer 140 to form a composite RF signal. The current summer 140 outputs the composite RF signal with phase and amplitude adjustments. In various embodiments, the composite RF signal may be in differential signal form. In other various embodiments, the composite RF signals may be in single-ended form.

In various embodiments, control for the quadrant shifting and VGA functions may be provided by a pair of DACs 160, 161. In various embodiments, reconfiguration of digital controller 150 allows the number of phase bits to be digitally controlled after vector generator 100 is fabricated if adequate DAC resolution and automatic gain control (AGC) dynamic range exists. In various embodiments with adequate DAC resolution and AGC dynamic range, suitable desired vector phase and amplitude can be produced with selectable fine quantization steps using digital control. In other various embodiments, reconfiguration of DACs 160, 161 can be made after vector generator 100 is fabricated in order to facilitate adjustment of the vector amplitudes.

Another component of the general purpose hybrid may be the active power splitter, which may be used to divide an input signal into two output signals. In various embodiments, an active power splitter converts an input RF signal into two output signals. The output signal levels may be equal in amplitude, though this is not required. For a passive power splitter, each output signal would be about 3 dB lower in power than the input signal. In contrast, by way of example, an active splitter can provide gain and facilitate adjusting and selectively designing the relative power level between the input signal and the output signal. In various embodiments, the output signal may be configured to achieve a substantially neutral or positive power gain over the input signal. For example, the output signal may achieve a 3 dB signal power gain over the input signal. In various embodiments, the output signal may achieve a power gain in the 0 dB to 5 dB range. Moreover, the output signal may be configured to achieve any suitable power gain. In accordance with various embodiments, the active power splitter may produce output signals with a differential phase between the two output signals that is zero or substantially zero. The absolute phase shift of output signals through the active power splitter may not be as important as the differential phasing between the output signals.

As mentioned above, an active power combiner may be a component of the general purpose hybrid. In various embodiments, an active power combiner converts two input RF signals into a single output signal. The output signal can either be a single ended output at a single ended output subcircuit, or a differential output at a differential output subcircuit. In other words, the active power combiner performs a function that is the inverse of the active power splitter. The input signal levels can be of arbitrary amplitude and phase. Similar to an active power splitter, the active power combiner can provide gain and the relative power level between the inputs and output can be also adjustable and can be selectively designed. In various embodiments, the output signal achieves a substantially neutral or positive signal power gain over the input signal. For example, the output signal may achieve a 3 dB power gain over the sum of the input signals. In various embodiments, the output signal may achieve a power gain in the 0 dB to 5 dB range. Moreover, the output signal may achieve any suitable power gain.

More information regarding various examples of structures and functionality of a vector generator, active power splitter, and active power combiner may be found in U.S. application Ser. No. 12/759,130, entitled "ACTIVE PHASED ARRAY ARCHITECTURE," filed Apr. 13, 2010, which is hereby incorporated by reference.

In accordance with various embodiments, a single circuit configuration of a general purpose hybrid may be configured to perform all functionalities of an active vector modulator, an active power splitter, or an active power combiner. In various embodiments, the general purpose hybrid has two input ports and two output ports. Further, the general purpose hybrid may comprise an active vector generator implemented in each of the four ports. Since the general purpose hybrid may comprise four vector generators, phase differences between the two input ports may be established as well as specific phase shifts on the input or output ports.

Figure 2:
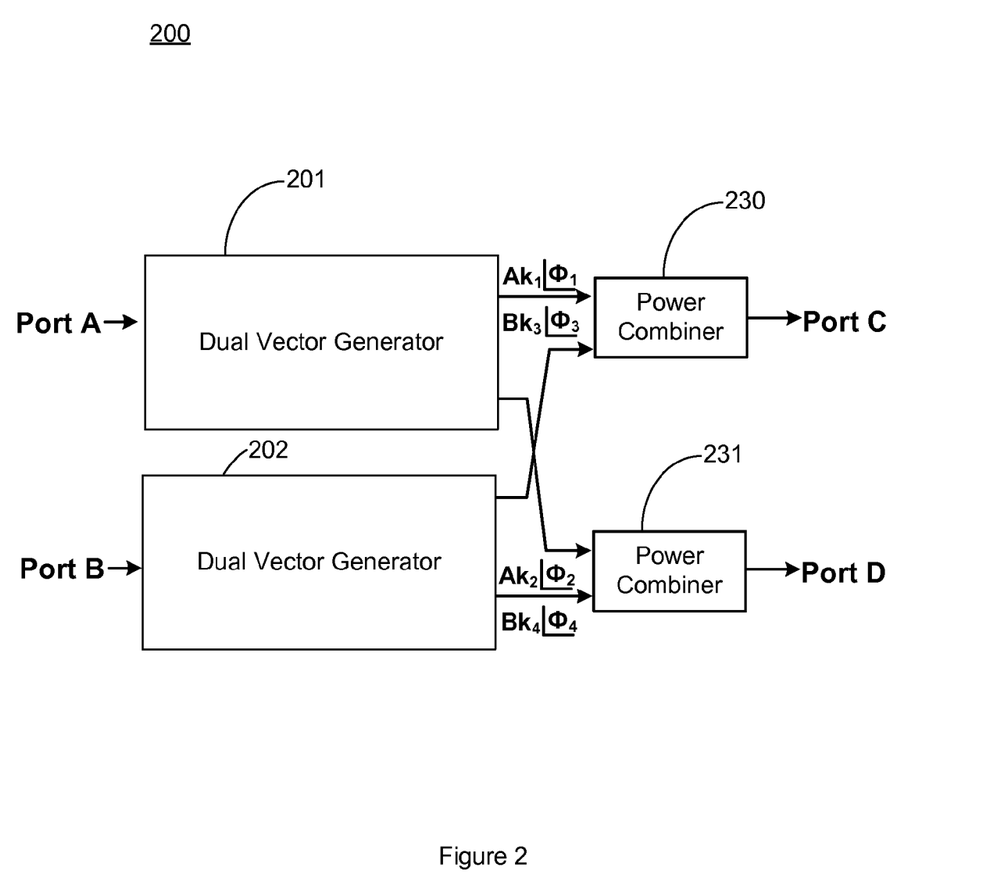
FIG. 2 illustrates an example embodiment of a general purpose hybrid.

In various embodiments and with reference to FIG. 2, a general purpose hybrid 200 may be a four port device with two input ports (Port A, Port B) and two output ports (Port C, Port D). Each output port may be a summation of the two input ports with flexible gain and phase adjustment. The general purpose hybrid 200 comprises a first dual vector generator 201 in parallel with a second dual vector generator 202. The first dual vector generator 201 may be in communication with first input port (Port A). The second dual vector generator 202 may be in communication with second input port (Port B).

The general purpose hybrid 200 further comprises a first active power combiner 230 and a second active power combiner 231, each of which may be configured to receive two intermediate output signals (one each from the first and second dual vector generators 201, 202). The intermediate output signals are cross-coupled between dual vector generators. By way of example, first active power combiner 230 may receive a first intermediate signal $Ak_1$ with phase change $\Phi_1$ and a third intermediate signal $Bk_3$ with phase change $\Phi_3$. Similarly, second active power combiner 231 may receive a second intermediate signal $Ak_2$ with phase change $\Phi_2$ and a fourth intermediate signal $Bk_4$ with phase change $\Phi_4$. The amplitude change (k) and phase change ($\Phi$) may be controlled by a digital controller (not shown) or may be controlled by analog control voltages (not shown). More specifically, the first active power combiner 230 may receive a first intermediate output signal from the first dual vector generator 201 and a third intermediate output signal from the second dual vector generator 202. Moreover, the second active power combiner 231 may receive a second intermediate output signal from the first dual vector generator 201 and a fourth intermediate output signal from the second dual vector generator 202. Stated another way, general purpose hybrid 200 includes two "through" ports and two "cross-coupled" ports.

Further, the design and structure of the dual vector generators have variations that perform the same or similar functionality. Namely, dual vector generators are configured to perform independent phase shifting and amplitude control for two signals. For example, in various embodiments and with reference to FIG. 3, a general purpose hybrid 300 may be a four port device with two input ports (Port A, Port B) and two output ports (Port C, Port D), similar to that described with reference to FIG. 2. The general purpose hybrid 300 comprises first and second dual vector generators 201, 202 in communication with first and second active power combiners 230, 231. Furthermore, first dual vector generator 201 comprises a first active power splitter 310 in communication with first input port (Port A), first vector generator 320, and second vector generator 321. First and second vector generator 320, 221 each may receive an intermediate input signal from first active power splitter 310. Similar to the intermediate signals disclosed with respect to FIG. 2, and by way of example, first active power combiner 230 may receive a first intermediate signal $Ak_1$ with phase change $\Phi_1$ and a third intermediate signal $Bk_3$ with phase change $\Phi_3$. Similarly, second active power combiner 231 may receive a second intermediate signal $Ak_2$ with phase change $\Phi_2$ and a fourth intermediate signal $Bk_4$ with phase change $\Phi_4$. The amplitude change (k) and phase change ($\Phi$) may be controlled by a digital controller (not shown) or may be controlled by analog control voltages (not shown). More specifically, in one various embodiment, first vector generator 320 may receive a first intermediate input signal from the first active power splitter 310 and second vector generator 321 receives a second intermediate input signal from the first active power splitter 310. Similarly, second dual vector generator 202 comprises a second active power splitter 311 in communication with second input port (Port B), third vector generator 322, and fourth vector generator 323. Third and fourth vector generator 322, 323 each may receive an intermediate input signal from second active power splitter 311. More specifically, in one various embodiment, third vector generator 322 may receive a third intermediate input signal from the second active power splitter 311 and fourth vector generator 323 may receive a fourth intermediate input signal from the second active power splitter 311.

Figure 3:
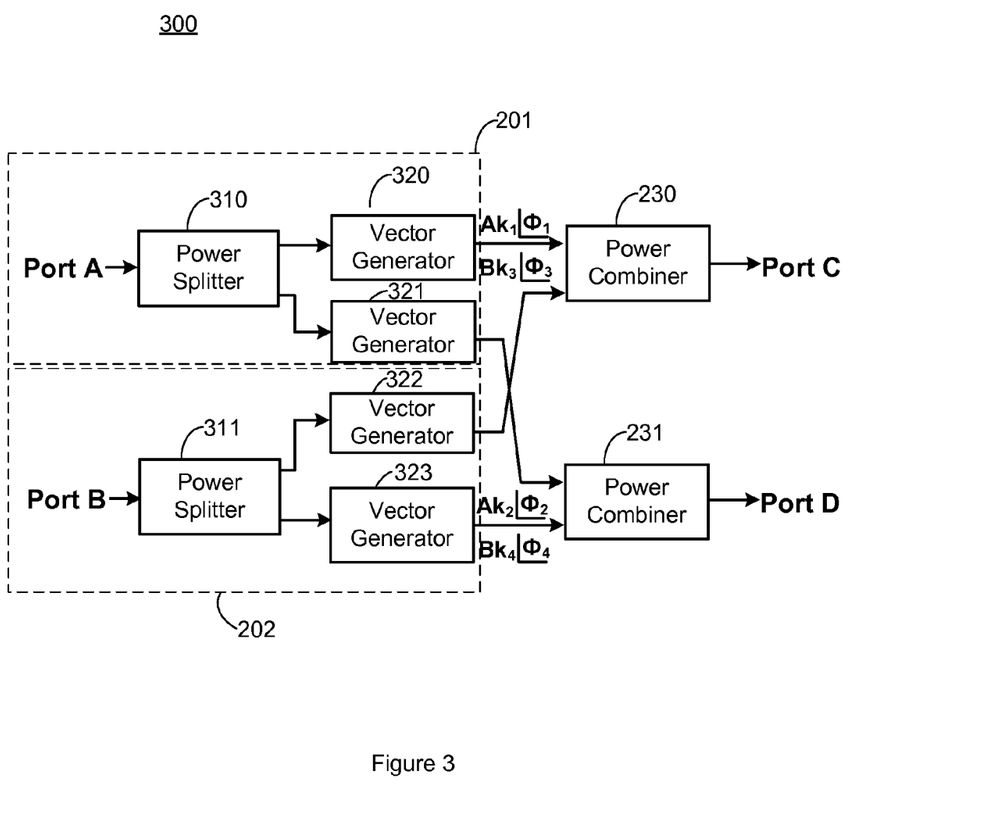
FIG. 3 illustrates another example embodiment of a general purpose hybrid.

With continued reference to FIG. 3, first active power combiner 230 and second active power combiner 231 may be each configured to receive two intermediate output signals from two of the four vector generators (320, 321, 322, 223). The intermediate output signals may be cross-coupled amongst the dual vector generators (201, 202). More specifically, the first active power combiner 230 may receive a first intermediate output signal from the first vector generator 320 and a third intermediate output signal from the third vector generator 322. Moreover, the second active power combiner 231 may receive a second intermediate output signal from the second vector generator 321 and a fourth intermediate output signal from the fourth vector generator 323. Stated another way, hybrid 300 includes two "through" ports and two "cross-coupled" ports. Furthermore, active power splitters may be replaced with passive splitters and active power combiners may be replaced with passive combiners.

Figure 4:
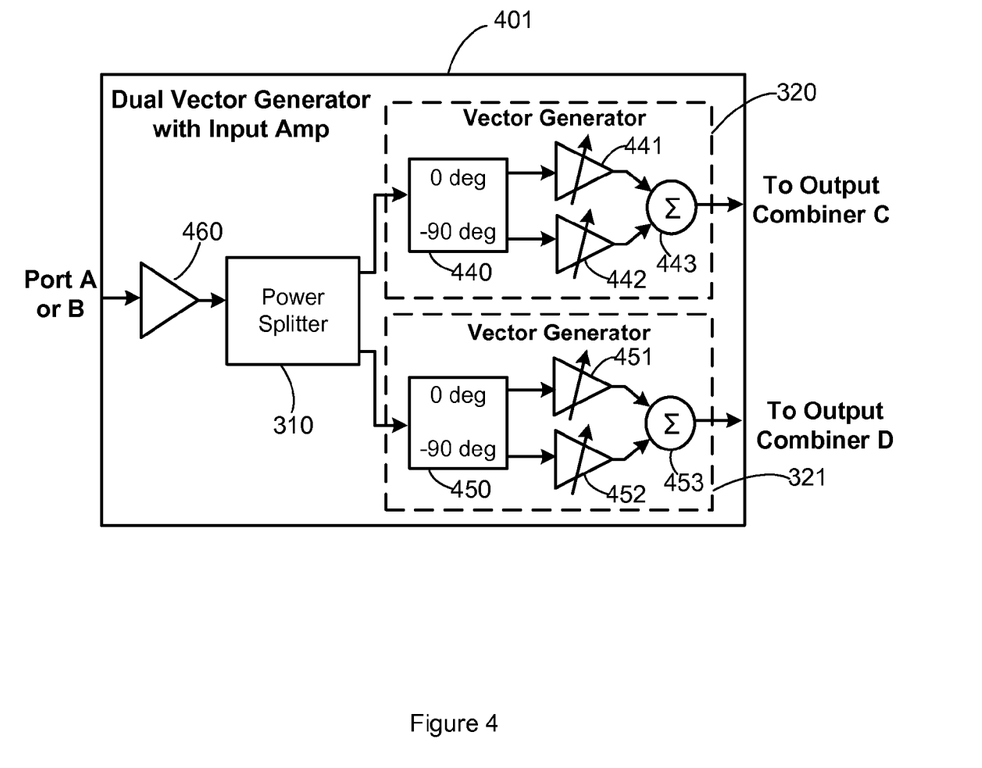
FIG. 4 illustrates an example embodiment of a dual vector generator.

In accordance with various embodiments and with reference to FIG. 4, a dual vector generator 401 comprises a power splitter 310, a first vector generator 320 and a second vector generator 321. Further, in various embodiments dual vector generator 401 may also comprise an input amplifier 460 that communicates an input signal to power splitter 310 as an amplified signal. Also, the first vector generator 320 comprises a 90° splitter 440, two variable gain amplifiers 441, 442 in parallel, and a combiner 443 to produce an output signal. In first vector generator 320, the 90° splitter 440 may provide a first signal to first variable gain amplifier 441 and a second signal to a second variable gain amplifier 442, where the second signal is phase shifted about 90° relative to the first signal. Output signals from each of the first and second variable gain amplifiers may be provided to combiner 443.

Similarly, the second vector generator 321 comprises a 90° splitter 450, two variable gain amplifiers 451, 452 in parallel, and a combiner 453 to produce an output signal. In second vector generator 321, the 90° splitter 450 may provide a first signal to first variable gain amplifier 451 and a second signal to a second variable gain amplifier 452, where the second signal may be phase shifted 90° relative to the first signal. Output signals from each of the first and second variable gain amplifiers may be provided to combiner 453. Thus, dual vector generator 401 takes a single input (Port A or B) and generates two output signals. Further, in various embodiments dual vector generator 401 may also comprise a controller (not shown) that may control one or more of variable gain amplifiers 441, 442, 451, 452. The controller may determine a phase shift and amplitude adjustment provided by dual vector generator 401. The phase shift and amplitude adjustment of at least one of the signals may be provided for polarization tracking and beam steering.

A dual vector generator may have other configurations, such as a dual vector generator with balanced input amplifiers. In various embodiments and with reference to FIG. 5, a dual vector generator 501 comprises a 90° splitter 510, and two amplifiers 520, 521 in parallel, with each amplifier 520, 521 outputting a signal to respective power splitters 530, 531. Each of the power splitters 530, 531 output signals (4 total) are cross-coupled to four variable gain amplifiers 540, 541, 542, 543, and two power combiners 550, 551 to produce two output signals.

Figure 5:
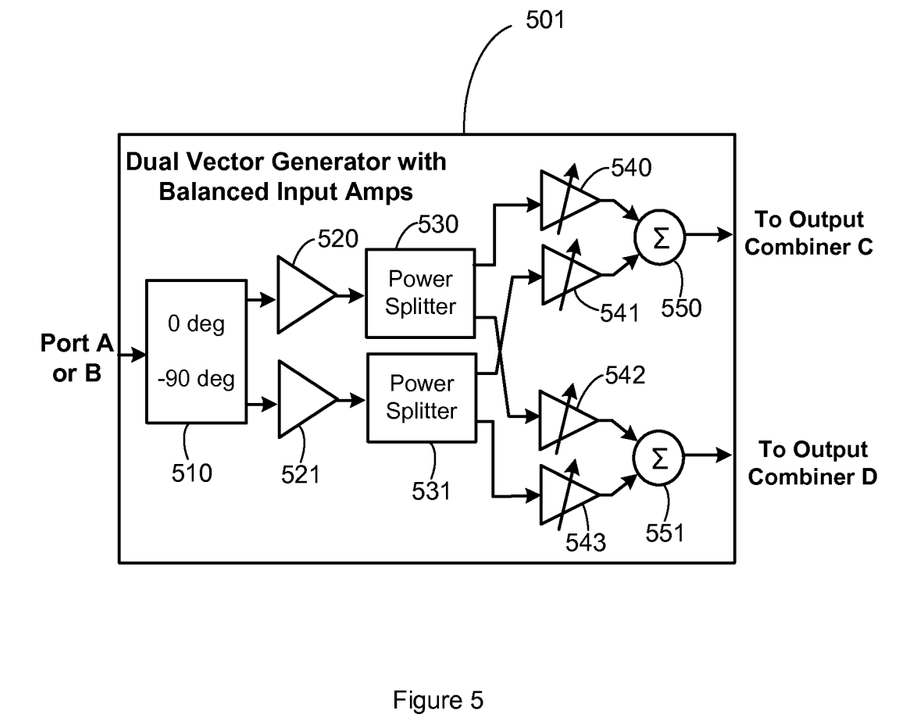
FIG. 5 illustrates another example embodiment of a dual vector generator.

More specifically, in this example, a first output signal of first power splitter 530 may be communicated to first variable gain amplifier 540 and a second output signal of first power splitter 530 may be communicated to third variable gain amplifier 542. Moreover, a first output signal of second power splitter 531 may be communicated to second variable gain amplifier 541 and a second output signal of second power splitter 531 may be communicated to fourth variable gain amplifier 543. The output signals of first variable gain amplifier 540 and second variable gain amplifier 541 are combined by first power combiner 550, whereas the output signals of third variable gain amplifier 542 and fourth variable gain amplifier 543 are combined by second power combiner 551. By combining the first output signals of power splitters 530, 531 and the second output signals of power splitters 530, 531, the output signals of the power splitters are cross-coupled. Advantages of the alternative dual vector generator design include being beneficial in designs where the 90° splitter is large, or where it is desirable to place amplifiers before the vector generators. In such embodiments, the input return loss of the dual vector generator 501 may be improved with the balanced amplifier configuration.

In various embodiments, the general purpose hybrid, alone or in combination with multiple general purpose hybrids, may be configurable to perform the same functionality various types of hybrids, such as an active ring hybrid, an active magic tee, an active branchline hybrid, an active Lange coupler, an active directional coupler, an active 180° hybrid, and an active Wilkinson hybrid. Moreover, the general purpose hybrid configuration may be located all on a single integrated circuit. In one embodiment, the general purpose hybrid can be on a 5×5 mm chip package. Furthermore, the hybrid may have wideband performance. For example, a general purpose hybrid may be capable of operations at about 2 GHz to about 18 GHz. Further, a general purpose hybrid may be capable of operating in one or more of the K-band, Ka-band, or Ku-band.

Part of the flexibility of the general purpose hybrid is due to the general purpose hybrid being capable of digital control. In various embodiments, the vector generators of general purpose hybrid 200 may be controlled by a serial programming interface (SPI) which allows the signals being combined at either output port (Port C, Port D) to be shifted in phase over 360°. Furthermore, the four independently controlled vector generators may be configurable for effective phase shifts to occur at either input or output, thereby providing capability to compensate for path length variations in various circuit applications. Instead of increasing a wire path length of a first signal to compensate for a delay in a corresponding second signal, the delay may be accounted for by adjusting the phase of the first signal. Stated another way, in various embodiments, a general purpose hybrid may be configured to independently control the phase of a first output signal to compensate for phase delay associated with differences in the lengths of the signal paths associated with first and second output signals. For example and with continued reference to FIG. 3, an "effective" phase shift of 5.625° deg can be placed at Port A by adjusting both vector generators 320, 321 to be 5.625° higher in phase shift than vector generators 322, 323. Likewise, an "effective" phase shift of 5.625° can be placed at Port D by adjusting vector generators 321, 323 to be 5.625° higher than vector generators 320, 322.

In accordance with various embodiments, the general purpose hybrid may be used in a variety of array antennas. The general purpose hybrid may be used in an N-element×M-beam modeformer with fixed or variable beam patterns. For example, the general purpose hybrid may be used as part of a modular design of a multi-beam Butler matrix. Phase delay compensation in Butler matrices may be configured so that the path length variations are compensated for matrices with up to 32 independent beams that may be steered. As another example, the general purpose hybrid may be used as part of a four arm spiral antenna. In yet other examples, the general purpose hybrid may be used as part of a variable phase power splitter, a variable phase power combiner, or a phase modulator.

A Butler matrix is a type of fixed beam forming network, in which each RF input into the matrix may be connected to a unique beam output. In various embodiments, a Butler matrix may be configured to operate over multiple frequency bands. In other words, the Butler matrix may be capable of transmitting signals from different frequency bands simultaneously. For example, the Butler matrix can be configured to transmit or receive signals in the Ku-band and the Ka-band simultaneously.

Figure 6:
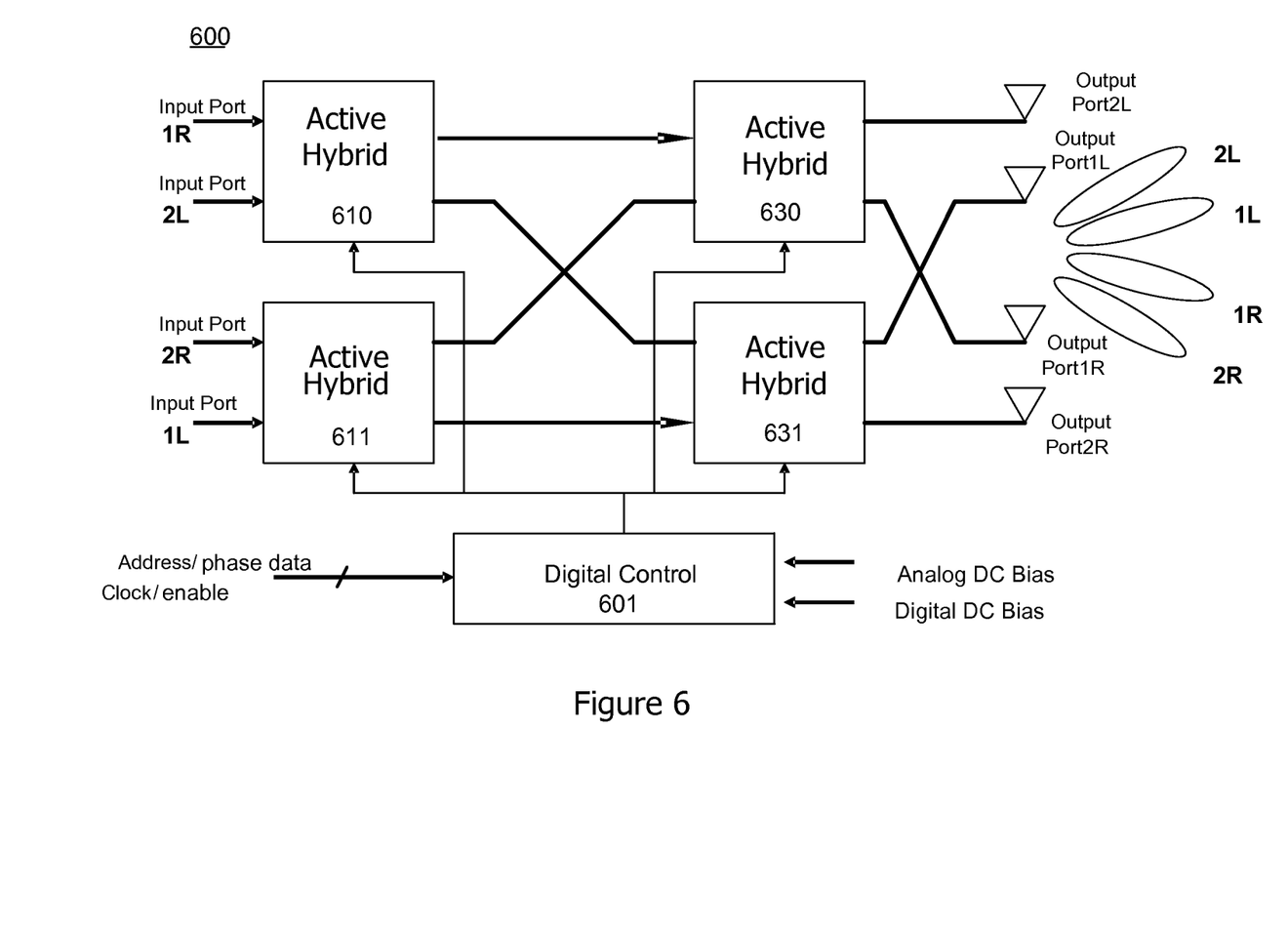
FIG. 6 illustrates an example embodiment of a dual vector generator incorporated into a Butler matrix.

In accordance with various embodiments and with reference to FIG. 6, a 4-beam active Butler matrix 600 comprises a first general purpose hybrid 610 in parallel with a second general purpose hybrid 611, and a third general purpose hybrid 630 in parallel with a fourth general purpose hybrid 631. The general purpose hybrids 610, 611, 630, 631 may be of similar description as general purpose hybrid 200. Furthermore, active Butler matrix 600 also comprises a digital controller 601. In various embodiments, digital controller 601 may be configured to control the digital settings of some or all of these electronic components.

In accordance with various embodiments, digital controller 601 provides the I/Q phase and amplitude commands as well as the quadrant select commands to each of the vector generators used within general purpose hybrids 610, 611, 630, 631. In various embodiments, if 4 bits of phase data were provided to each of the vector generators, a total of 64 bits of phase information would be managed by the digital controller 601. In other various embodiments, analog and digital bias voltages are applied to the vector generators. The digital voltage may be used to power the digital controller functions while the analog voltage may be used to power the RF functions. Keeping the analog and digital voltages separate serves to minimize the digital switching noise that may be induced onto the RF lines.

In various embodiments, Butler matrix 600 has four input ports and four output ports. In accordance with the various embodiments, first general purpose hybrid 610 receives an input signal from Input Port 1R and another input signal from Input Port 2L. Furthermore, first general purpose hybrid 610 may communicate a first signal to third general purpose hybrid 630 and a second signal to fourth general purpose hybrid 631. First general purpose hybrid 610 combines the two input signals and injects a phase difference between the first signal and the second signal.

Likewise, second general purpose hybrid 611 may receive an input signal from Input Port 2R and another input signal from Input Port 1L. Second general purpose hybrid 611 may communicate a third signal to third general purpose hybrid 630 and a fourth signal to fourth general purpose hybrid 631. Second general purpose hybrid 611 combines the two input signals and injects a phase difference between the third signal and the fourth signal.

In various embodiments, third general purpose hybrid 630 may receive a first signal from general purpose hybrid 610 and the third signal from second general purpose hybrid 611. Third general purpose hybrid 630 may output a first output signal to Output Port 2L and a second output signal to Output Port 1R. Third general purpose hybrid 630 combines the first signal and the third signal and injects a phase difference between the first output signal and the second output signal.

Similarly, fourth general purpose hybrid 631 may receive a fourth signal from second general purpose hybrid 611 and the second signal from first general purpose hybrid 610. Fourth general purpose hybrid 631 outputs a third output signal to Output Port 1L and a fourth output signal to Output Port 2R. Fourth general purpose hybrid 631 combines the second signal and the fourth signal and injects a phase difference between the third output signal and the fourth output signal.

Furthermore, in accordance with various embodiments, any portion of active Butler matrix 600 may implement differential signaling. For example, differential signaling may be used to communicate signals between at least one of first general purpose hybrid 610 to third general purpose hybrid 630, first general purpose hybrid 610 to fourth general purpose hybrid 631, second general purpose hybrid 611 to fourth general purpose hybrid 631, and second general purpose hybrid 611 to third general purpose hybrid 630. Additionally, differential signaling may be used at the input ports and/or the output ports.

The capability and size of an active Butler matrix is scalable, depending on the desired number of beams to form. One advantage of an active Butler matrix comprising general purpose hybrids as previously described is the reduced number of components compared to a standard Butler matrix configuration. The general purpose hybrids may be capable of operating with various phase shifts, and may not be limited to 90° or 180° phase shifts. Thus, a general purpose hybrid may be configured to account for phase delays and the active Butler matrix may not include other components to adjust for phase delay.

In general, the disclosure is provided by way of example and is not a limitation. The specific ranges and numbers disclosed in the papers are for illustration only, and do not limit the invention to those specific examples, ranges, or frequency bands. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "includes," "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The invention claimed is:

1. A hybrid circuit comprising:
   a first active circuit to divide a first input signal into a first pair of divided signals, and to independently adjust each of the first pair of divided signals to form a first pair of intermediate signals, wherein the first active circuit comprises a first plurality of vector generators to adjust the first pair of divided signals, and wherein a vector generator of the first plurality of vector generators comprises a first quadrant select in parallel with a second quadrant select, and a first variable gain amplifier in parallel with a second variable gain amplifier;
   a second active circuit to divide a second input signal into a second pair of divided signals, and to independently adjust each of the second pair of divided signals to form a second pair of intermediate signals, wherein the second active circuit comprises a second plurality of vector generators to adjust the second pair of divided signals; and
   a combiner circuit to combine one of the intermediate signals of the first pair and one of the intermediate signals of the second pair to form a first output signal, and to combine another of the intermediate signals of the first pair and another of the intermediate signals of the second pair to form a second output signal.

2. The hybrid circuit of claim 1, wherein the first and second active circuits are responsive to commands to change adjustment of the first and second pairs of divided signals respectively.

3. The hybrid circuit of claim 1, wherein the first and second active circuits adjust the first and second pairs of divided signals to compensate for signal path length differences associated with the first and second output signals.

4. The hybrid circuit of claim 1, wherein:
   the first active circuit adjusts at least one of phase and amplitude of each of the second pair of divided signals; and
   the second active circuit adjusts at least one of phase and amplitude of each of the second pair of divided signals.

5. The hybrid circuit of claim 1, wherein:
   the first active circuit further comprises an active splitter to divide the first input signal into the first pair of divided signals; and the first plurality of vector generators includes a first vector generator and a second vector generator to independently adjust respective divided signals of the first pair of divided signals.

6. The hybrid circuit of claim 5, wherein the first vector generator comprises:
   a second active splitter to divide one of the first pair of divided signals into a pair of phase adjusted signals, and inject a 90 degree relative phase difference between the pair of phase adjusted signals;
   a first variable gain amplifier to amplify one of the pair of phase adjusted signals;
   a second variable gain amplifier to amplify another of the pair of phase adjusted signals; and
   a combiner to combine the amplified pair of phase adjusted signals to form the one of the first pair of intermediate signals.

7. A hybrid circuit comprising:
   a first active circuit to divide a first input signal into a first pair of divided signals, and to independently adjust each of the first pair of divided signals to form a first pair of intermediate signals;
   a second active circuit to divide a second input signal into a second pair of divided signals, and to independently adjust each of the second pair of divided signals to form a second pair of intermediate signals; and
   a combiner circuit to combine one of the intermediate signals of the first pair and one of the intermediate signals of the second pair to form a first output signal, and to combine another of the intermediate signals of the first pair and another of the intermediate signals of the second pair to form a second output signal;
   wherein the first active circuit comprises:
      a network of active splitters to divide the first input signal into the first pair of divided signals, inject a 90 degree relative phase difference between the first pair of divided signals, divide one of the first pair of divided signals into a third pair of divided signals, and divide another of the first pair of divided signals into a fourth pair of divided signals;
      a plurality of variable gain amplifiers to amplify the third pair of divided signals to form a first pair of amplified signals, and to amplify the fourth pair of divided signals to form a second pair of amplified signals;
      a first combiner to combine one of the first pair of amplified signals and one of the second pair of amplified signals to form the one of the first pair of intermediate signals; and
      a second combiner to combine another of the first pair of amplified signals and another of the second pair of amplified signals to form the another of the first pair of intermediate signals.

* * * * *